(12) United States Patent
Koehler et al.

(10) Patent No.: US 9,177,366 B2
(45) Date of Patent: Nov. 3, 2015

(54) EDGE-PRESERVING NOISE FILTERING

(75) Inventors: Thomas Koehler, Norderstedt (DE);
Bernhard Brendel, Norderstedt (DE)

(73) Assignee: Koninklijke Philips N.V., Eindhoven (NL)

( * ) Notice: Subject to any disclaimer, the term of this patent is extended or adjusted under 35 U.S.C. 154(b) by 99 days.

(21) Appl. No.: 13/696,149

(22) PCT Filed: May 16, 2011

(86) PCT No.: PCT/IB2011/052137
§ 371 (c)(1),
(2), (4) Date: Nov. 5, 2012

(87) PCT Pub. No.: WO2011/145040
PCT Pub. Date: Nov. 24, 2011

(65) Prior Publication Data
US 2013/0064469 A1    Mar. 14, 2013

(30) Foreign Application Priority Data
May 21, 2010  (EP) .................................. 10163531

(51) Int. Cl.
*G06T 5/00*    (2006.01)
*G06T 5/50*    (2006.01)

(52) U.S. Cl.
CPC . *G06T 5/002* (2013.01); *G06T 5/50* (2013.01); *G06T 2207/10072* (2013.01); *G06T 2207/10116* (2013.01); *G06T 2207/20028* (2013.01); *G06T 2207/20221* (2013.01)

(58) Field of Classification Search
CPC ............ G06T 5/50; G06T 2007/20028; G06T 2007/20192
USPC ........................................................... 382/261
See application file for complete search history.

(56) References Cited

U.S. PATENT DOCUMENTS

| | | | |
|---|---|---|---|
| 4,761,819 A | | 8/1988 | Denison et al. |
| 5,115,394 A | * | 5/1992 | Walters .......................... 382/131 |
| 7,502,499 B2 | | 3/2009 | Grady |
| 2004/0218235 A1 | * | 11/2004 | Kawano ......................... 358/505 |
| 2006/0039532 A1 | | 2/2006 | Wu et al. |

(Continued)

FOREIGN PATENT DOCUMENTS

WO    2008107837 A1    9/2008

OTHER PUBLICATIONS

Bennett, E. P., et al.; Multispectral Bilateral Video Fusion; 2007; IEEE Trans. on Image Processing; 16(5)1185-1194.

(Continued)

*Primary Examiner* — Yubin Hung

(57) ABSTRACT

The invention relates to an image processing apparatus (1) comprising an image providing unit (2) for providing a first image of an object and a second image of the same object and a filtering unit (3) which filters the first image depending on a first degree of similarity between image values of the first image and on a second degree of similarity between image values of the second image. This allows filtering the first image depending on the likeliness that image values belong to the same part of the object, for example, to tissue or to bone material of the object, if the object is a human being or an animal, even if due to noise the image values of one of the first image and the second image are disturbed, thereby improving, for example, an edge preserving property of the filtering procedure.

19 Claims, 3 Drawing Sheets

(56) References Cited

U.S. PATENT DOCUMENTS

| | | | |
|---|---|---|---|
| 2007/0183558 | A1 | 8/2007 | Hempel |
| 2009/0135998 | A1 | 5/2009 | Rossl et al. |
| 2009/0285480 | A1 | 11/2009 | Bennett et al. |
| 2010/0034296 | A1* | 2/2010 | Cunha et al. ............. 375/240.29 |
| 2010/0220834 | A1* | 9/2010 | Heismann et al. ............. 378/19 |
| 2011/0268328 | A1* | 11/2011 | Bar-Aviv et al. ............. 382/128 |

OTHER PUBLICATIONS

Brosnan, T., et al.; Noise Reduction in Magnetic Resonance Imaging; 1988; Magnetic Resonance in Medicine; 8:394-409.

Chu, C. K., et al.; Edge-Preserving Smoothers for Image Processing; 1998; Journal of the American Statistical Association; 93(442)526-541.

Llopart, X., et al.; First test measurements of a 64k pixel readout chip working in single photon counting mode; 2003; Nuclear Instruments and Methods in Physics Research; A509:157-163.

Llopart, X., et al.; Medipix2: a 64-k Pixel Readout Chip with 55-um Square Elements Working in Single Photon Counting Mode; 2002; IEEE Trans. on Nuclear Science; 49(5)2279-2283.

Paris, S., et al.; A Gentle Introduction to Bilateral Filtering and its Applications; 2007; Computer Graphics Proceedings of Siggraph Intl. Conf. on Computer Graphics and Interactive Techniques; pp. 1-45.

Rebuffel, V., et al.; Dual-energy X-ray imaging; benefits and limiits; 2007; Insight; 49(10)589-594.

Weitkamp, T., et al.; X-ray phase imaging with a grating interferometer; 2005; Optics Express; 12(16)6296-6304.

Wunderlich, A., et al.; Image Covariance and Lesion Detectability in Direct Fan-Beam X-Ray Computed Tomography; 2008; Phys. Med. Biol.; 53(10)2471-2493.

* cited by examiner

EDGE-PRESERVING NOISE FILTERING

FIELD OF THE INVENTION

The invention relates to an image processing apparatus, image processing method and image processing computer program for processing an image.

BACKGROUND OF THE INVENTION

The article "Edge-Preserving Smoothers for Image Processing" by C. K. Chu et al., Journal of the American Statistical Association, Vol. 93, No. 442, pp. 526-541, June 1998 discloses a filtering method, which is adapted to perform a filtering of an image such that undesirable noise is reduced while preserving edges. However, if the CNR (contrast-to-noise ratio) is too small in the image, edges may not be observable and may not be preserved, leading to a blurring of the image and, thus, to a decreasing image quality.

SUMMARY OF THE INVENTION

It is therefore an object of the present invention to provide an image processing apparatus, image processing method and image processing computer program for processing an image, wherein the image quality of the processed image can be improved.

In a first aspect of the present invention an image processing apparatus for processing an image is presented, wherein the image processing apparatus comprises:

an image providing unit for providing a first image of an object and a second image of the same object, a filtering unit for filtering the first image, wherein the filtering unit is adapted to filter the first image depending on a first degree of similarity between image values of the first image and on a second degree of similarity between image values of the second image.

The filtering depending on degrees of similarity between image values allows filtering the first image depending on the likeliness that image values belong to the same part of the object, for example, to tissue or to bone material of the object, if the object is a human being or an animal. For instance, if degrees of similarity between image values of the first image and of the second image are large, it is likely that the corresponding image values belong to the same part of the object. In contrast, if the degrees of similarity between image values of the first image and the second image are smaller, it is more likely that they belong to different parts of the object and are separated, for example, by an edge of the object. Even if due to noise or other disturbances the image values of the first image are more similar then they would be without the noise or the other disturbances, during filtering the likelihood that the image values show the same part of the object can be considered, because the filtering unit is adapted to filter the first image not only depending on the first degree of similarity between image values of the first image, but also on the second degree of similarity between image values of the second image which may not be disturbed by the same degree as the first image or which may not be disturbed at all. This allows improving the image quality of the first image.

The image providing unit can be a storing unit in which the first image and the second image are stored already, or the image providing unit can be an imaging modality like a computed tomography system, a magnetic resonance imaging system, a nuclear imaging system, an ultrasound imaging system, et cetera. If the image providing unit is an imaging modality, the image processing apparatus can also be regarded as an imaging system which generates images of the object and which processes these images.

The filtering unit is preferentially also adapted to filter the second image depending on the first degree of similarity between image values of the first image and on the second degree of similarity between image values of the second image.

The first image and the second image can be two-, three- or four-dimensional images. They show the same object, i.e. the whole object or only a part of the object, for example, only a slice of the object, preferentially at the same time and/or in the same moving state, if the object is moving. The first image and the second image are reconstructed preferentially based on the same acquired data, in particular, projection data, of the object. The filtering unit is preferentially adapted to determine the first degree of similarity depending on a difference between image values of the first image and to determine the second degree of similarity depending on differences between image values of the second image, wherein with increasing difference, in particular, with increasing absolute difference, the degree of similarity decreases. Also other similarity measures can be used for determining the degree of similarity between image values like the ratio of image values, wherein the degree of similarity increases, with decreasing deviation of the ratio from one.

The filtering unit is preferentially adapted to perform the filtering such that the first image and/or the second image are denoised. It is preferred that the filtering unit is adapted to weightedly average image values of image elements of the first image, wherein for determining an average image value for a first image element of the first image, image values of first region image elements within a first region, which comprises the first image element, are weighted and averaged, wherein the image values of the first region image elements are weighted with weights depending on the first degree of similarity being a degree of similarity between a) the image values of the first region image elements and b) the image value of the first image element of the first image the second degree of similarity being a degree of similarity between a) image values of second region image elements within a second region, which corresponds to the first region, of the second image and b) the image value of a second image element, which corresponds to the first image element, of the second image. This allows filtering the first image by simple mathematical operations and, thus, with low computational efforts.

It is further preferred that the filtering unit is adapted such that the weight of an image value of a first region image element decreases, if one of a) the first degree of similarity between the first region image element and the first image element and b) the second degree of similarity between the second region image element and the second image element decreases, and if the other of a) the first degree of similarity between the first region image element and the first image element and b) the second degree of similarity between the second region image element and the second image element remains unchanged or decreases. The filtering unit can also be adapted such that the weight of an image value of a first region image element decreases, if one of a) the first degree of similarity between the first region image element and the first image element and b) the second degree of similarity between the second region image element and the second image element decreases, and if the other of a) the first degree of similarity between the first region image element and the first image element and b) the second degree of similarity between the second region image element and the second image element increases. The weight of an image value of a first region element decreases therefore preferentially, if at least one of the first degree of similarity and the second degree of similarity decreases. This allows considering image values having a larger degree of similarity in at least one of the images stronger than other image values in a simple way. The respective image value can therefore receive a small weight, even if due to noise or other disturbances the degree of similarity is larger in one of the images than it would be without noise or the other disturbances.

It is further preferred that the first degree of similarity is a degree of similarity between a) the image values of the first region image elements and image values of image elements surrounding the respective first region image element and b) the image value of the first image element and image values of image elements surrounding the first image element of the first image, and wherein the second degree of similarity is a degree of similarity between a) image values of second region image elements within a second region, which corresponds to the first region, of the second image and image values of image elements surrounding the respective second region image element, and b) the image value of a second image element, which corresponds to the first image element, of the second image and image values of image elements surrounding the second image element. Thus, for determining the respective degree of similarity not only pairs of image values are considered, but groups of image values, wherein a degree of similarity is determined between these different groups of image values. This allows, for example, considering structures shown in the different groups of image values, while determining the respective degree of similarity.

It is further preferred that the first degree of similarity is the probability that image values of the first image are similar, if the first image would be denoised, and wherein the second degree of similarity is the probability that image values of the second image are similar, if the second image would be denoised. It is further preferred that the filtering unit is adapted to determine the probability that image values are similar based on differences between the image values. This allows filtering the image values directly depending on the probability that the image values would be similar, if the respective image would be denoised.

It is further preferred that the filtering unit is adapted to filter the first image depending on distances between image elements in at least one of the first image and the second image. Since the likeliness that different image elements belong to different parts of the object increases, if their distance increases, by filtering the first image depending on distances between image elements in at least one of the first image and the second image, the filtering such that, for example, edges are preserved, can further be improved, thereby further improving the quality of the processed image.

It is further preferred that the image providing unit is adapted to provide the first image and the second image such that they show different properties of the object. It is further preferred that the image providing unit is adapted to provide spectral computed tomography images, wherein the first image is indicative of a first physical property of the object and the second image is indicative of a second physical property of the object, the first physical property and the second physical property being different from each other. It is further preferred that one of the first image and the second image is a Compton image, and the other of the first image and the second image is a photoelectric image. It is further preferred that one of the first image and the second image is a Compton image or a photoelectric image, and the other of the first image and the second image is a combination of a Compton image and a photoelectric image. The image providing unit can also be adapted to provide differential phase contrast computed tomography images, wherein one of the first image and the second image is indicative of the absorption of the object and the other of the first image and the second image is indicative of a phase shift of radiation, which traverses the object, induced by the object. The first image can show the total attenuation coefficient of the object and the second image can show the real part of the refractive index of the object. If the first image and the second image show different properties of the object it is likely that, if in a certain region in the first image noise is present, that in the corresponding region in the second image noise may not be present to the same degree or may not be present at all. Thus, if, for example, an edge would not be observable in a certain region in the first image because of noise, this edge may be observable in the corresponding region in the second image and can be considered during the filtering process by filtering the first image and/or the second image depending on the first degree of similarity between image values of the first image and the second degree of similarity between image values of the second image.

In a further aspect of the present invention an image processing method for processing an image is presented, wherein the image processing method comprises:

providing a first image of an object and a second image of the same object, filtering the first image depending on a first degree of similarity between image values of the first image and on a second degree of similarity between image values of the second image.

In a further aspect of the present invention an image processing computer program for processing an image is presented, wherein the computer program comprises program code means for causing an image processing apparatus as defined in claim 1 to carry out the steps of the image processing method as defined in claim 13, when the computer program is run on a computer controlling the image processing apparatus.

It shall be understood that the image processing apparatus of claim 1, the image processing method of claim 13 and the image processing computer program of claim 14 have similar and/or identical preferred embodiments, in particular, as defined in the dependent claims.

It shall be understood that a preferred embodiment of the invention can also be any combination of the dependent claims with the respective independent claim.

These and other aspects of the invention will be apparent from and elucidated with reference to the embodiments described hereinafter.

DETAILED DESCRIPTION OF EMBODIMENTS

Figure 1:
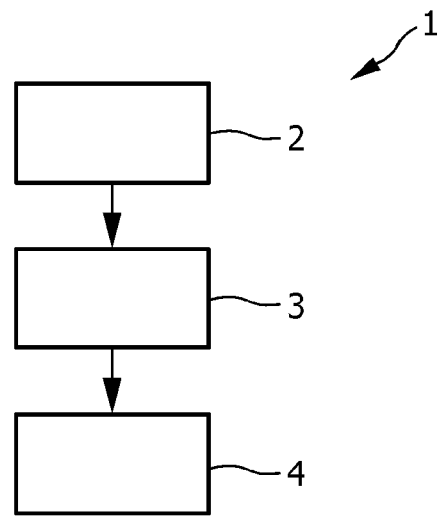
FIG. 1 shows schematically and exemplarily an embodiment of an image processing apparatus for processing an image.

FIG. 1 shows schematically and exemplarily an embodiment of an image processing apparatus 1 for processing an image. The image processing apparatus 1 comprises an image providing unit 2 for providing a first image of an object and a second image of the same object. The image processing apparatus 1 further comprises a filtering unit 3 for filtering the first image, wherein the filtering unit 3 is adapted to filter the first image depending on a first degree of similarity between image values of the first image and on a second degree of similarity between image values of the second image. The filtering unit 3 is preferentially adapted to filter also the second image depending on the first degree of similarity between image values of the first image and on the second degree of similarity between image values of the second image. The filtered images can be shown on a display 4.

The first image and the second image can be two-, three- or four-dimensional images showing the same object which can be a whole object or only a part of an object, for example, only a slice of an object. If the object is a moving object like the heart of a person the first image and the second image show the object preferentially in the same moving state. This embodiment, the first image and the second image are reconstructed based on projection data, in particular, based on computed tomography projection data, wherein the first image and the second image are reconstructed from the same projection data.

The image providing unit 2 is adapted to provide the first image and the second image such that they show different properties, in particular, different physical properties, of the object. In an embodiment, the image providing unit 2 is adapted to provide spectral computed tomography images, wherein the first image is indicative of a first physical property of the object and the second image is indicative of a second physical property of the object, wherein the first physical property and the second physical property are different from each other. For example, one of the first image and the second image can be a Compton image and the other of the first image and the second image can be a photoelectric image, or one of the first image and the second image can be a Compton image or a photoelectric image, and the other of the first image and the second image can be a combination of a Compton image and a photoelectric image.

Figure 2:
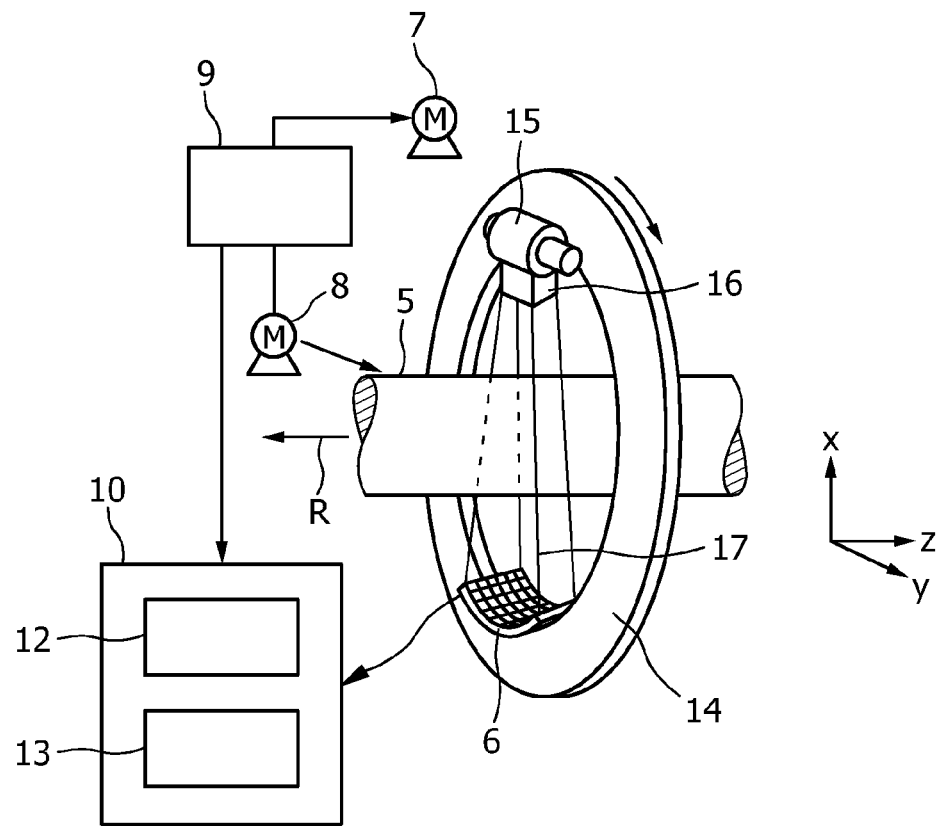
FIG. 2 shows schematically and exemplarily an embodiment of an image providing unit.

The image providing unit 2 can be a storing unit, in which the first image and the second image are stored, or the image providing unit 2 can also be an image receiving unit allowing to receive the first image and/or the second image via a data connection. The image providing unit 2 can also be an imaging modality like a spectral computed tomography system which generates the first image and the second image. Such a spectral computed tomography system will in the following schematically and exemplarily be described with reference to FIG. 2.

The spectral computed tomography system includes a gantry 14 which is capable of rotating around an axis of rotation R, which extends parallel to the z direction. A radiation source 15, for example an X-ray tube, is mounted on the gantry 14. In this embodiment, the radiation source 15 emits polychromatic radiation. The radiation source 15 is provided with a collimator device 16 which forms a conical radiation beam 17 from the radiation emitted by the radiation source 15. In other embodiments, the collimator device 16 can be adapted for forming a radiation beam having another shape, for example, having a fan shape.

The radiation traverses an object (not shown in FIG. 2), such as a patient or a technical object, in a region of interest in a cylindrical examination zone 5. After having traversed the region of interest, the radiation beam 17 is incident on a detection device 6 having in this embodiment a two-dimensional detection surface, wherein the detection device 6 is mounted on the gantry 14. In another embodiment, the detection device 6 can comprise a one-dimensional detection surface.

The detection device 6 comprises preferentially energy-resolving detector elements. The energy-resolving detector elements are preferentially photon-counting detector elements which work, for example, on the principle of counting the incident photons and output a signal that shows the number of photons in different energy windows. Such an energy-resolving detection device is, for instance, described in Llopart X., et al., "First test measurements of a 64 k pixel readout chip working in a single photon counting mode", Nucl. Inst. and Meth. A, 509 (1-3): 157-163, 2003 and in Llopart, X., et al., "Medipix2: A 64-k pixel readout chip with 55 µm square elements working in a single photon counting mode", IEEE Trans. Nucl. Sci. 49(5): 2279-2283, 2002. Preferably, the energy-resolving detector element are adapted such that each detector element provides at least two energy-resolved detection signals for at least two different energy windows. However, it is favorable to have an even higher energy resolution in order to enhance the sensitivity and noise robustness of the imaging system.

The gantry 14 is driven at a preferably constant but adjustable angular speed by a motor 7. A further motor 8 is provided for displacing the object, for example, a patient who is arranged on a patient table in the examination zone 5, parallel to the direction of the axis of rotation or the z axis. These motors 7, 8 are controlled by a control unit 9, for instance, such that the radiation source 15 and the examination zone 5, in particular, the region of interest, move relative to each other along a helical trajectory. It is also possible, that the object or the examination zone 5, in particular the region of interest, is not moved and that the radiation source 15 is rotated, i.e. that the radiation source 15 travels along a circular trajectory relative to the region of interest. The data acquired by the detection device 6 are, in this embodiment, energy-dependent detection data which are provided to a reconstruction unit 10 for reconstructing at least the first and second image of the region of interest from the provided energy-dependent detection data. Also the reconstruction unit 10 is preferentially controlled by the control unit 9. The reconstructed images are provided to the filtering unit 3 for filtering at least the first image.

The reconstruction unit 10 comprises a calculation unit 12 for determining at least two attenuation components from the detection data. An attenuation component of the detection data is caused by only one or by several physical effects, for example, one attenuation component can be a component caused by the Compton effect and another attenuation component can be a component caused by the photoelectric effect. A further attenuation component can be a component caused by a k-edge present in the region of interest. Alternatively or in addition, an attenuation component can be a component caused by, for example, an absorption of a certain material within the region of interest. For example, an attenuation component can be a component caused by the absorption of a certain material and another attenuation component can be a component caused by the absorption of another material.

The reconstruction unit 10 further comprises a backprojection unit 13 for backprojecting the calculated attenuation components of the detection data such that corresponding attenuation component images are reconstructed. For example, a Compton image can be reconstructed as one of the first image and the second image and a photoelectric image can be reconstructed as the other of the first image and the second image.

Figure 3:
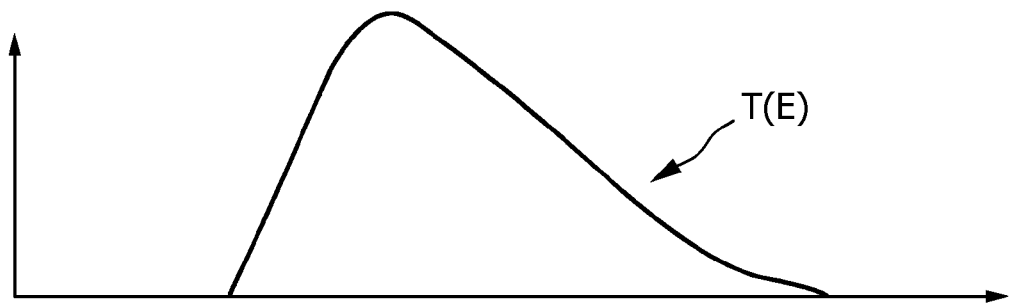
FIG. 3 shows schematically and exemplarily an emission spectrum of a polychromatic radiation source.

The input to the calculation unit 12 are energy-resolved detection data $d_i$ of a plurality, in this embodiment at minimum three, energy bins. These detection data $d_i$ show a spectral sensitivity $D_i(E)$ of the i-th energy bin $b_i$. Furthermore, the emission spectrum $T(E)$ of the polychromatic radiation source 15 is generally known or can be measured. An example of such an emission spectrum $T(E)$ of a polychromatic radiation source is schematically and exemplarily shown in FIG. 3. In the calculation unit 12 the generation of the detection data $d_i$ is modeled as a linear combination of the photoelectric effect with spectrum $P(E)$, the Compton effect with spectrum $C(E)$ and a k-edge with spectrum $K(E)$.

Figure 4:
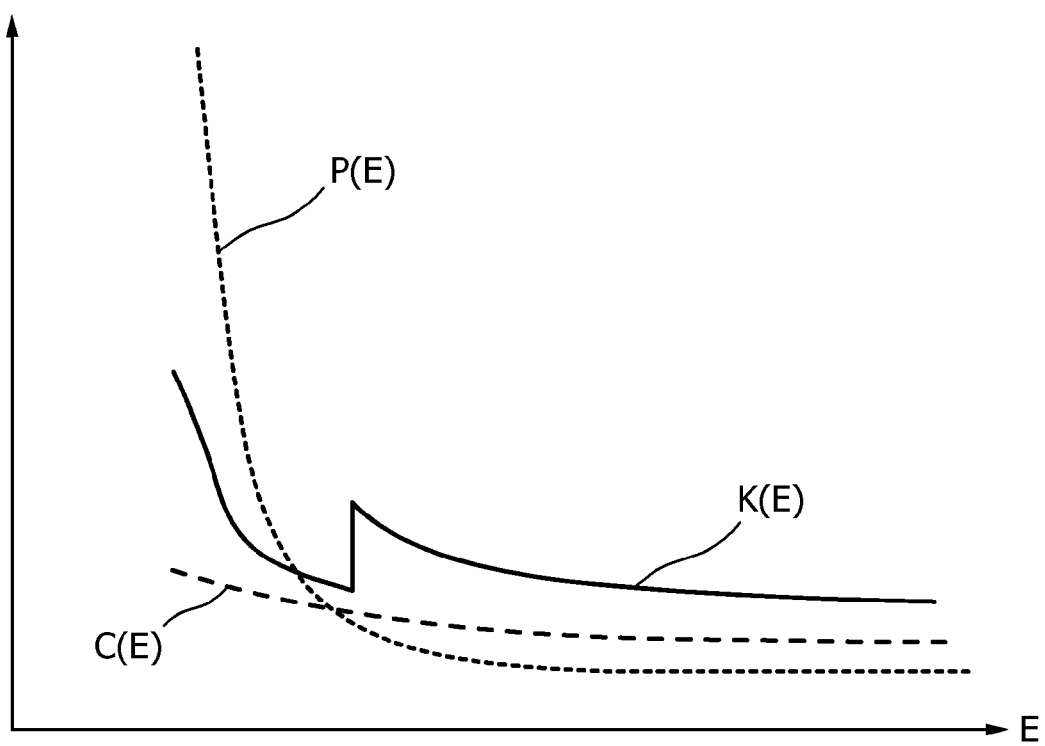
FIG. 4 shows schematically and exemplarily a photoelectric spectrum, a Compton spectrum and a spectrum with a k-edge.

Spectra $P(E)$, $C(E)$ and $K(E)$ are exemplarily and schematically shown in FIG. 4.

The generation of the detection data can be modeled by following system of equations:

$$d_i = \int dE \, T(E) D_i(E) \exp[-(\rho_{photo} P(E) + \rho_{Compton} C(E) + \rho_{k\text{-}edge} K(E))], \quad (1)$$

wherein $\rho_{photo}$, $\rho_{Compton}$ and $\rho_{k\text{-}edge}$ are the density length products of the photoelectric component, the Compton component and the k-edge component, respectively.

Since at least three detection signals $d_1$, $d_2$, $d_3$ are available for the at least three energy bins $b_1$, $b_2$, $b_3$, a system of at least three equations is formed having three unknowns, which are the three density length products, which can thus be solved with known numerical methods in the calculation unit 12. If more than three energy bins are available, it is preferred to use a maximum likelihood approach that takes the noise statistics of the measurements into account. Generally, three energy bins are sufficient. In order to increase the sensitivity and noise robustness, however, it is preferred to have more detection data for more energy bins. For each attenuation component, i.e. for each density length product, an attenuation component image of the object can be reconstructed by backprojecting the respective density length product. Alternatively or in addition, images of different density length products or, before backprojecting, different density length products can be combined for generating a combination image being an image of the object generated by the combined attenuation components.

In another embodiment, the image providing unit 2 can be adapted to provide differential phase contrast computed tomography images, wherein one of the first image and the second image is indicative of the absorption of the object and the other of the first image and the second image is indicative of a phase shift of radiation, which traverses the object, induced by the object. In particular, the first image shows preferentially the total attenuation coefficient of the object and the second image shows preferentially the real part of the refractive index of the object. Also these first and second images can be stored in a storing unit which may be the image providing unit 2 or can be received via an image receiving unit which may also be the image providing unit 2. However, the image providing unit 2 can also be a differential phase contrast computed tomography system, which generates the first image and the second image and which will exemplarily and schematically be described in the following with reference to FIG. 5.

Figure 5:
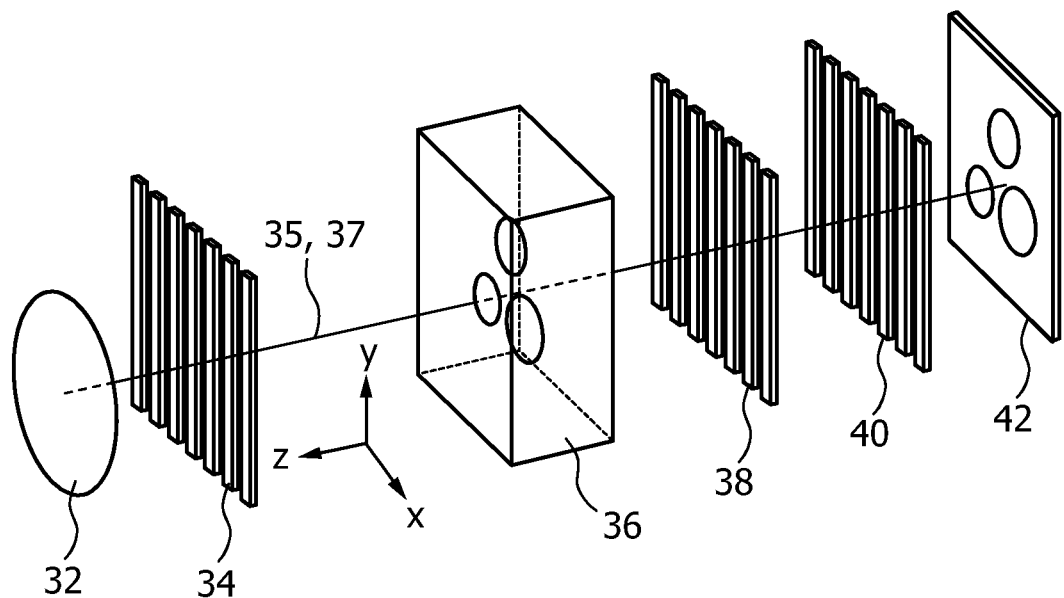
FIG. 5 shows schematically and exemplarily elements of an embodiment of a differential phase contrast computed tomography system.

FIG. 5 shows a three-dimensional representation of an exemplary embodiment of a differential phase contrast computed tomography system. A rather large X-ray source 32 is arranged adjacent to a source grating 34. Since the X-ray source 32 may be considered to be incoherent due to its size with respect to the wavelength of the radiation emitted, a source grating 34 is employed for providing a plurality of single coherent X-ray sources.

X-radiation 35 emanates from X-ray source 32 in the direction of the optical axis 37 possibly constituting a fan-beam or cone-beam of X-rays. The respective shape of the X-ray beam is not depicted in FIG. 5. X-radiation 35 arrives at object 36, penetrates object 36, and subsequently arrives at a beam splitter grating 38. The trenches or gaps of the beam splitter grating 38 alter the phase of passing electromagnetic radiation with respect to the solid areas of the beam splitter grating, the blocking region. Accordingly, a phase shift by $\phi$, in particular by $\pi$, is performed.

An analyzer grating 40 is arranged between the beam splitter grating 38 and an X-ray detector 42. The multiple waves originating from the beam splitter grating 38 in the direction of the X-ray detector arrive at the analyzer grating 40, and subsequently produce an intensity modulation pattern on the surface of the X-ray detector 42.

By shifting the beam splitter grating 38 versus the analyzer grating 40, thus displacing of gratings relative to one another, in particular with a fraction of the grating periods of the beam splitter grating 38 or the analyzer grating 40, a plurality of transmission images are obtainable by the image detector 42. Thus, during the acquisition of the transmission images, a so-called phase stepping is performed, where the relative position of the gratings 38, 40 is varied, for example, in four to ten steps, over one period and a transmission image is measured for each relative position. From this series of transmission images, the conventional absorption image is obtained by simple averaging the measured intensity for each detector pixel. As in conventional x-ray transmission imaging, this measurement is related to the line integral over the total attenuation coefficient along the x-ray path by Beer's law. Information about the real part of the refractive index is obtained by analysis of the dynamics of the measured intensity over the phase stepping cycle. The intensity varies preferentially periodically with the grating period of the analyzer grating 40. Typically, a sinusoidal variation can be assumed. The phase of the sinus is related to the gradient of the phase front hitting the beam splitter grating 38. By physics, this gradient of the phase front is linearly related to the first derivative of the projection of the real part of the refractive index of the object. Thus, the projection of the real part of the refractive index of the object can be determined based on the phase of the sinus. By backprojecting the determined projection of the real part of the refractive index of the object, an image showing the real part of the refractive index of the object can be reconstructed. The differential phase contrast computed tomography system can therefore reconstruct, for example, a first image showing the total attenuation coefficient of the object and a second image showing the real part of the refractive index of the object. A more detailed description of the known differential phase contrast computed tomography technique is disclosed in, for example, the article "X-ray phase imaging with a grating interferometer", by Timm Weitkamp et al., OPTICS EXPRESS, vol. 13, no. 16, pages 6296-6304 (August 2005), which is herewith incorporated by reference.

Referring again to FIG. 1, the filtering unit 3 is preferentially adapted to perform the filtering such that the first image is denoised by using following filtering equation:

$$\hat{u}^{(1)}(\vec{x}_i) = \frac{\sum_{\vec{x}_j \in \Delta_i} L_1(\vec{u}^{(1)}(\vec{x}_i) - \vec{u}^{(1)}(\vec{x}_j)) L_2(\vec{u}^{(2)}(\vec{x}_i) - \vec{u}^{(2)}(\vec{x}_j)) K(\vec{x}_i - \vec{x}_j) u^{(1)}(\vec{x}_j)}{\sum_{\vec{x}_j \in \Delta_i} L_1(\vec{u}^{(1)}(\vec{x}_i) - \vec{u}^{(1)}(\vec{x}_j)) L_2(\vec{u}^{(2)}(\vec{x}_i) - \vec{u}^{(2)}(\vec{x}_j)) K(\vec{x}_i - \vec{x}_j)}, \quad (2)$$

wherein $\hat{u}^{(1)}(\vec{x}_i)$ denotes an average image value for a first image element at a position $\vec{x}_i$ of the first image, $\Delta_i$ denotes a first region which comprises the first image element at the position $\vec{x}_i$, $\vec{x}_j$ denotes positions of first region image elements within the first region $\Delta_i$, $L_1(\vec{u}^{(1)}(\vec{x}_i) - \vec{u}^{(1)}(\vec{x}_j))$ denotes the first degree of similarity between a) the image value of the first region image element $\vec{x}_j$ and optionally image values of image elements surrounding the respective first region element at the position $\vec{x}_j$, and b) the image value of the first image element at the position $\vec{x}_i$ an optionally image values of image elements surrounding the first image element of the first image.

The function $L_2(\vec{u}^{(2)}(\vec{x}_i) - \vec{u}^{(2)}(\vec{x}_j))$ denotes a second degree of similarity between a) the image value of the second region image element at the position $\vec{x}_j$, within a second region, which corresponds to the first region, of the second image and optionally image values of image elements surrounding the second region element at the position $\vec{x}_j$, and b) the image value of a second image element at the position $\vec{x}_i$, which corresponds to the first image element at the same position in the first image, of the second image and optionally image values of image elements surrounding the second image element. The function $K(\vec{x}_i - \vec{x}_j)$ is a distance function which depends on distances between the image elements at the positions $\vec{x}_i$ and $\vec{x}_j$ and $\vec{u}^{(1)}(\vec{x}_j)$ denotes the unfiltered image value at the position $\vec{x}_j$, in the first image.

The combination of the first degree of similarity $L_1$, the second degree of similarity $L_2$ and the distance function K divided by the denominator shown in equation (2) can be regarded as a weight for performing the weighted averaging in accordance with equation (2). Thus, in accordance with equation (2), the filtering unit 3 is preferentially adapted to weightedly average image values of image elements of the first image, wherein for determining an average image value for a first image element of the first image, image values of first region image elements within a first region, which comprises the first image element, are weighted and averaged, wherein the image values of the first region image elements are weighted with weights depending on the first degree of similarity being a degree of similarity between a) the image values of the first region image elements and optionally image values of image elements surrounding the respective first image element and b) the image value of the first image element and image values of image elements surrounding the first image element of the first image, and depending on the second degree of similarity being a degree of similarity between a) image values of second region image elements within a second region, which corresponds to the first region of the second image and optionally image values of image elements surrounding the respective second region image element, and b) the image value of a second image element, which corresponds to the first image element, of the second image and optionally image values of image elements surrounding the second image element.

The vector $\vec{u}(\vec{x}_{i,j})$ can be regarded as an image patch centered around $\vec{x}_{i,j}$. For instance, if the optional image values of image elements surrounding the respective first image element and the optional image values of image elements surrounding the respective second image element are considered, in a two-dimensional case, the image patch may be a 9×9 sub-image centered around the pixel at the position $\vec{x}_{i,j}$. The patch can also have another size. For example, the patch can have a 5×5 or 7×7 size. Moreover, also a three-dimensional patch can be used. If the optional image values are not considered, i.e. if only differences between single image values at the positions $\vec{x}_i$ and $\vec{x}_j$ are considered, the respective vector comprises only the respective single image value at the position $\vec{x}_i$ or $\vec{x}_j$, respectively. The patch size is then 1×1.

If the filtering is performed based on more than two images, the filtering unit 3 is preferentially adapted to filter the first image in accordance with following filtering equation:

$$\hat{u}^{(1)}(\vec{x}_i) = \frac{\sum_{\vec{x}_j \in \Delta_i} \prod_{k=1...N} L_k(\vec{u}^{(k)}(\vec{x}_i) - \vec{u}^{(k)}(\vec{x}_j)) K(\vec{x}_i - \vec{x}_j) u^{(1)}(\vec{x}_j)}{\sum_{\vec{x}_j \in \Delta_i} \prod_{k=1...N} L_k(\vec{u}^{(k)}(\vec{x}_i) - \vec{u}^{(k)}(\vec{x}_j)) K(\vec{x}_i - \vec{x}_j)}, \quad (3)$$

wherein N denotes the number of images considered for filtering the first image and the index k indicates that the respective element belongs to the k-th image.

The k-th degree of similarity can be defined by following equation:

$$L_k(\vec{u}^{(k)}(\vec{x}_i) - \vec{u}^{(k)}(\vec{x}_j)) = e^{-\|\vec{u}^{(k)}(\vec{x}_i) - \vec{u}^{(k)}(\vec{x}_j)\|^2 / 2\sigma_L^{(k)}(\vec{x}_i) \sigma_L^{(k)}(\vec{x}_j)}, \quad (4)$$

wherein $\sigma_L^{(k)}(\vec{x}_i)$ and $\sigma_L^{(k)}(\vec{x}_j)$ denote local noise estimates at the position $\vec{x}_i$ and $\vec{x}_j$, respectively.

Noise estimates can be obtained either manually by determination of the standard deviation within a region that is considered to be in reality a homogeneous region. It is also possible to obtain spatially resolved noise estimates by classical noise propagation starting from the noise in the initial raw data which is known at least to a good approximation. The known classical noise propagation is disclosed in, for example, the article "Image covariance and lesion detectability in direct fan-beam x-ray computed tomography" by Adam Wunderlich et al., Institute of Physics and Engineering in Medicine, pages 2471 to 2493 (2008), which is herewith incorporated by reference. The same concept can be applied to differential phase contrast computed tomography as well as spectral computed tomography.

Instead of local noise estimates also a global noise estimate can be used, in particular, if the noise is not largely varying across the images.

The above mentioned equations ensure that the weight of an image value of a first region image element decreases, if one of a) the first degree of similarity between the first region image element and the first image element and b) the second degree of similarity between the second region image element and the second image element decreases and if the other of a) the first degree of similarity between the first region image element and the first image element and b) the second degree of similarity between the second region image element and the second image element remains unchanged or decreases.

The degrees of similarity provide an estimate how likely the two image values or the two image patches are the same, in particular, if the respective image would be denoised. The degree of similarity defined in equation (4) can therefore also be regarded as a kind of probability that image values are similar. For differences much smaller than the noise, the likelihood or probability is close to one, and the degree of similarity falls to zero for differences larger than the noise level. In particular, if image patches having a size larger than 1×1 are considered, because of the Gaussian prototype of the degree of similarity the resulting weight of an image value at the position $\vec{x}_j$, will be small, if the image patches around $\vec{x}_i$ and $\vec{x}_j$ are statistically different in either of the N images. It can therefore be ensured that no smoothing across statistically significant edges in the first image is performed. The filtering is therefore edge preserving.

The distance function, which can also be regarded as a spatial weighting function, can be defined by following equation:

$$K(\vec{x}_i - \vec{x}_j) = e^{-|\vec{x}_i - \vec{x}_j|/2\sigma_K^2}, \quad (5)$$

or $$K(\vec{x}_i - \vec{x}_j) = \begin{cases} 1 & \text{for } |\vec{x}_i - \vec{x}_j| < \sigma_K \\ 0 & \text{else} \end{cases}, \quad (6)$$

wherein the parameter $\sigma_K$ controls the effective size of the neighborhood taken into account during averaging.

Figure 6:
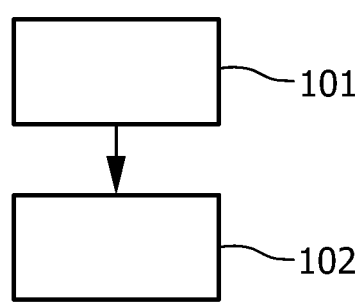
FIG. 6 shows exemplarily a flowchart illustrating an embodiment of an image processing method for processing an image.

In the following an embodiment of an image processing method for processing an image will exemplarily be described with reference to a flowchart shown in FIG. 6.

In step 101, a first image of an object and a second image of the same object are provided. For example, the first image and the second image can be provided by a storing unit or can be generated by an imaging modality like a spectral computed tomography system or a differential phase contrast computed tomography system. In step 102, the first image is filtered depending on the first degree of similarity between image values of the first image and on the second degree of similarity between image values of the second image. This filtering is preferentially performed in accordance with the above mentioned equations.

The first image and the second image are preferentially acquired simultaneously and show preferentially exactly the same slice within the object in the same motion state, if the object is a moving object like a heart of a person. The filtering unit explodes the availability of the several images in a denoising process. Preferentially, the filtering process is applied several times on the first image.

In the prior art, filtering is hampered by following problems. In spectral computed tomography systems the noise in the photoelectric images and in the Compton images is highly anti-correlated, i.e. the noise level in each of the images is relatively high. Moreover, in phase contrast images the CNR of different tissue types can be quite different in the different images. Some anatomical structure may not be visible with a CNR larger than one, leading to an unwanted blurring of these structures. These problems can be reduced or eliminated by using the above described filtering unit, wherein the weight by which the respective image value $\vec{u}^{(1)}(\vec{x}_j)$ is weighted during the weighted averaging performed by the filtering unit becomes small if an edge is detected in either of the first image and the second image.

Although in the above described embodiments, the filtering has been described with a diffusion filter of the Gaussian type, the basic idea of filtering a first image depending on a degree of similarity between image values of the first image and on a degree of similarity between image values of a second image can also be applied to other filtering methods, in particular, to filtering methods using another diffusion filter, the mean-shift filter and/or the bi-lateral filter, because all these methods share the feature that low-pass filtering is applied substantially only in regions with "similar" image values. For all these methods, the classification of image values being "similar" can be based on the additional images at hand, i.e. there are only "similar" if there are "similar" in all images, or equivalently, an edge is assumed to be present, if it is detected in at least one of the images.

Although in an above described embodiment a spectral computed tomography system is adapted to generate different attenuation component images like a Compton image and a photoelectric image, which are regarded as first and second images, wherein at least the first image is filtered depending on a first degree of similarity between image values of the first image and on a second degree of similarity between image values of the second image, the spectral computed tomography system can also be adapted to generate for each energy bin a corresponding energy bin image, wherein one of these energy bin images is regarded as a first image and another of these energy bin images is regarded as a second image and wherein at least the first image is filtered depending on a first degree of similarity between image values of the first image and on a second degree of similarity between image values of the second image. As spectral processing can be applied to the filtered energy bin images for generating, for example, a Compton image, a photoelectric image and optionally a k-edge image.

Although in the above described embodiments, certain degrees of similarities have been described, on which the filtering is based, in other embodiments also other degrees of similarity can be used for filtering the first image as long as the first image is filtered depending on a first degree of similarity between image values of the first image and a second degree of similarity between image values of the second image.

Although in the above described embodiments a spectral computed tomography system and a differential phase contrast computed tomography system have been described for generating the first and second images, also other imaging modalities can be used for generating the first and second images of the same object. For example, a magnetic resonance imaging system, a nuclear imaging system, an ultrasound imaging system, et cetera can be used for generating the first and second and possibly also further images of the same object in the same moving state, if the object is a moving object like the heart or another organ of a person.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Calculations like the filtering and the backprojection performed by one or several units or devices can be performed by any other number of units or devices. For example, the reconstruction of the first image and the second image and the filtering can be performed by a single unit or by any other number of different units. The calculations and/or the control of the image processing apparatus in accordance with the image processing method can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention relates to an image processing apparatus comprising an image providing unit for providing a first image of an object and a second image of the same object and a filtering unit which filters the first image depending on a first degree of similarity between image values of the first image and on a second degree of similarity between image values of the second image. This allows filtering the first image depending on the likeliness that image values belong to the same part of the object, for example, to tissue or to bone material of the object, if the object is a human being or an animal, even if due to noise the image values of one of the first image and the second image are disturbed, thereby improving, for example, an edge preserving property of the filtering procedure.

The invention claimed is:

1. An image processing apparatus for processing an image, the image processing apparatus comprising:
   an image providing unit, executed by a microprocessor, that provides a first image of an object and a second image of the same object,
   a filtering unit, executed by the microprocessor, that filters the first image, wherein the filtering unit filters the first image depending on a first degree of similarity between image values of the first image and on a second degree of similarity between image values of the second image,
   wherein the filtering unit weightedly averages image values of image elements of the first image by determining an average image value for a first image element of the first image through:

$$\hat{u}^{(1)}(\vec{x}_i) = \frac{\sum_{\vec{x}_j \in \Delta_i} L_1(\vec{u}^{(1)}(\vec{x}_i) - \vec{u}^{(1)}(\vec{x}_j)) L_2(\vec{u}^{(2)}(\vec{x}_i) - \vec{u}^{(2)}(\vec{x}_j)) K(\vec{x}_i - \vec{x}_j) u^{(1)}(\vec{x}_j)}{\sum_{\vec{x}_j \in \Delta_i} L_1(\vec{u}^{(1)}(\vec{x}_i) - \vec{u}^{(1)}(\vec{x}_j)) L_2(\vec{u}^{(2)}(\vec{x}_i) - \vec{u}^{(2)}(\vec{x}_j)) K(\vec{x}_i - \vec{x}_j)}$$

wherein $\hat{u}^{(1)}(\vec{x}_i)$ denotes the average image value for the first image element at a position $\vec{x}_i$ of the first image, $\Delta_i$ denotes a first region which comprises the first image element at the position $\vec{x}_i$, and $\vec{x}_j$ denotes positions of first region image elements within the first region $\Delta_i$, wherein $L_1(\vec{u}^{(1)}(\vec{x}_i) - \vec{u}^{(1)}(\vec{x}_j))$ denotes the first degree of similarity between a) the image value of the first region image element $\vec{x}_j$ and image values of image elements surrounding the respective first region element at the position $\vec{x}_j$ and b) the image value of the first image element at the position $\vec{x}_i$ and image values of image elements surrounding the first image element of the first image;

wherein $L_2(\vec{u}^{(2)}(\vec{x}_i) - \vec{u}^{(2)}(\vec{x}_j))$ denotes a second degree of similarity between a) the image value of the second region image element at the position $\vec{x}_j$ within a second region, which corresponds to the first region, of the second image and optionally image values of image elements surrounding the second region element at the position $\vec{x}_j$, and b) the image value of a second image element at the position $\vec{x}_i$, which corresponds to the first image element at the same position in the first image, of the second image and optionally image values of image elements surrounding the second image element;

wherein $K(\vec{x}_i - \vec{x}_j)$ denotes a distance function which depends on distances between the image elements at the positions $\vec{x}_i$ and $\vec{x}_j$;

wherein $\vec{u}^{(1)}(\vec{x}_j)$ denotes an unfiltered image value at the position $\vec{x}_j$ in the first image; and wherein a k-th degree of similarity is based on:

$$L_k(\vec{u}^{(k)}(\vec{x}_i) - \vec{u}^{(k)}(\vec{x}_j)) = e^{-\|\vec{u}^{(k)}(\vec{x}_i) - \vec{u}^{(k)}(\vec{x}_j)\|^2 / 2\sigma_L^{(k)}(\vec{x}_i) \sigma_L^{(k)}(\vec{x}_j)}, \quad (4)$$

wherein $\sigma_L^{(k)}(\vec{x}_i)$ and $\sigma_L^{(k)}(\vec{x}_j)$ are local noise estimates at the position $\vec{x}_i$ and $\vec{x}_j$, respectively.

2. The image processing apparatus as defined in claim 1, wherein the filtering unit decreases the weight of an image value of a first region image element, if one of a) the first degree of similarity between the first region image element and the first image element and b) the second degree of similarity between the second region image element and the second image element decreases, and if the other of a) the first degree of similarity between the first region image element and the first image element and b) the second degree of similarity between the second region image element and the second image element remains unchanged or decreases.

3. The image processing apparatus as defined in claim 1, wherein the first degree of similarity is the probability that image values of the first image are similar, if the first image would be denoised, and wherein the second degree of similarity is the probability that image values of the second image are similar, if the second image would be denoised.

4. The image processing apparatus as defined in claim 3, wherein the filtering unit determines the probability that image values are similar based on differences between the image values.

5. The image processing apparatus as defined in claim 1, wherein the filtering unit filters the first image depending on distances between image elements in at least one of the first image and the second image.

6. The image processing apparatus as defined in claim 1, wherein the image providing unit provides the first image and the second image such that they show different properties of the object.

7. The image processing apparatus as defined in claim 6, wherein the image providing unit provides spectral computed tomography images, wherein the first image is indicative of a first physical property of the object and the second image is indicative of a second physical property of the object, the first physical property and the second physical property being different from each other.

8. The image processing apparatus as defined in claim 7, wherein one of the first image and the second image is a Compton image, and the other of the first image and the second image is a photoelectric image.

9. The image processing apparatus as defined in claim 7, wherein one of the first image and the second image is a Compton image or a photoelectric image, and the other of the first image and the second image is a combination of a Compton image and a photoelectric image.

10. The image processing apparatus as defined in claim 1, wherein the image providing unit provides differential phase contrast computed tomography images, wherein one of the first image and the second image is indicative of the absorption of the object and the other of the first image and the second image is indicative of a phase shift of radiation, which traverses the object, induced by the object.

11. The image processing apparatus as defined in claim 1, wherein the weight by which the image value $\vec{u}^{(1)}(\vec{x}_j)$ is weighted during the weighted averaging performed by the filtering unit becomes small if an edge is detected in either of the first image and the second image.

12. The image processing apparatus as defined in claim 11, wherein the spatial weighting function is $K(\vec{x}_i - \vec{x}_j) = e^{-|\vec{x}_i - \vec{x}_j|/2\sigma_K^2}$ wherein $\sigma_K$ controls an effective size of the neighborhood taken into account during averaging.

13. The image processing apparatus as defined in claim 11, wherein the spatial weighting function is $$K(\vec{x}_i - \vec{x}_j) = \begin{cases} 1 & \text{for } |\vec{x}_i - \vec{x}_j| < \sigma_K \\ 0 & \text{else} \end{cases}$$

wherein $\sigma^K$ controls an effective size of the neighborhood taken into account during averaging.

14. The image processing apparatus as defined in claim 12, wherein the distance is calculated based on a spatial weighting function.

15. The image processing apparatus as defined in claim 1, wherein the filtering is based on more than two images, and the filtering unit filters based on:

$$\hat{u}^{(1)}(\vec{x}_i) = \frac{\sum_{\vec{x}_j \in \Delta_i} \prod_{k=1...N} L_k(\vec{u}^{(k)}(\vec{x}_i) - \vec{u}^{(k)}(\vec{x}_j)) K(\vec{x}_i - \vec{x}_j) u^{(1)}(\vec{x}_j)}{\sum_{\vec{x}_j \in \Delta_i} \prod_{k=1...N} L_k(\vec{u}^{(k)}(\vec{x}_i) - \vec{u}^{(k)}(\vec{x}_j)) K(\vec{x}_i - \vec{x}_j)}, \quad (3)$$

wherein N denotes a number of images for filtering the first image and an index k indicates that the respective element belongs to a k-th image.

16. An image processing method for processing an image, the image processing method comprising:
    providing a first image of an object and a second image of the same object,
    filtering the first image by weightedly averaging image values of image elements of the first image based on a first degree of similarity between image values of the first image and on a second degree of similarity between image values of the second image,
    wherein for determining an average image value for a first image element at a first position of the first image, the filtering determines a ratio of a summation of first products to a summation of second products,
    wherein the summation of the first product is a product of the first degree of similarity, the second degree of similarly, a distance between the image elements at the first position and a second position, and an unfiltered image value at the second position of the first image, and
    wherein the summation of the second product is a product of the first degree of similarity, the second degree of similarly, the distance between the image elements at the first position and the second position.

17. The image processing method of claim 16, further comprising:
    performing a weighted averaging through the combination of the first degree of similarity, the second degree of similarity and the distance divided by a denominator.

18. The image processing method of claim 16, further comprising:
    providing a third image of the same object, wherein the filtering is based on at least all three of the images.

19. An image processing computer program, stored on a non-transitory computer readable medium, for processing an image, the computer program comprising program code means for causing an image processing apparatus as defined in claim 1 to carry out the steps of the image processing method, when the computer program is run on a computer controlling the image processing apparatus.

* * * * *